United States Patent

Cours et al.

[11] Patent Number: 6,162,273
[45] Date of Patent: Dec. 19, 2000

[54] FLORAL FOAM FOR CUT FLOWERS

[75] Inventors: Herman Georges Marie Cours, Naarden; Johannes Antonius Marie Janssen, Almere; Joseph Anton Johannes Huijsmans, Aalsmeer; Paul Thomas Dirk Herman, Swifterbant, all of Netherlands

[73] Assignee: Pokon & Chrysal B.V., Naarden, Netherlands

[21] Appl. No.: 09/202,286

[22] PCT Filed: Jun. 16, 1997

[86] PCT No.: PCT/NL97/00336

§ 371 Date: Dec. 11, 1998

§ 102(e) Date: Dec. 11, 1998

[87] PCT Pub. No.: WO97/47180

PCT Pub. Date: Dec. 18, 1997

[30] Foreign Application Priority Data

Jun. 14, 1996 [NL] Netherlands ............... 1003343

[51] Int. Cl.[7] ........................................... A47G 7/00
[52] U.S. Cl. ............... 71/31; 71/64.01; 71/63; 71/900; 47/44; 47/65.1; 47/41.12
[58] Field of Search ............... 71/31, 64.01, 63, 71/900; 47/44, 65.5, 41.12

[56] References Cited

U.S. PATENT DOCUMENTS

| | | |
|---|---|---|
| 2,753,277 | 7/1956 | Smithers . |
| 3,769,037 | 10/1973 | Sholl ........................ 426/281 |
| 3,826,041 | 7/1974 | King . |
| 4,225,679 | 9/1980 | Pilato ........................ 521/109 |
| 4,238,374 | 12/1980 | Durham et al. ........... 260/17.4 |
| 5,207,733 | 5/1993 | Perrin ............................ 47/87 |
| 5,588,256 | 12/1996 | Sherfield ....................... 47/62 |
| 5,659,996 | 8/1997 | Weder et al. ................ 47/1.01 |
| 5,813,194 | 9/1998 | Weder ........................ 53/399 |
| 5,970,654 | 10/1999 | Skinner ..................... 47/41.01 |

FOREIGN PATENT DOCUMENTS

| | | |
|---|---|---|
| 659 549 | 5/1995 | Australia . |
| 0 634 430 | 1/1995 | European Pat. Off. . |
| 1 509 585 | 3/1968 | France . |

*Primary Examiner*—Gary P. Straub
*Attorney, Agent, or Firm*—Young & Thompson

[57] ABSTRACT

A floral foam which contains nutrients an preservatives for cut flowers is described, which floral foam has been pre-injected with nutrients and preservatives in an amount of 8–12 g per $dm^3$ water which can be absorbed by the foam. A method for the production of such a floral foam is also described. The floral foam is pre-injected with 10–30 ml of a solution containing nutrients and preservatives per $dm^3$ water which can be absorbed by the floral foam.

12 Claims, No Drawings

FLORAL FOAM FOR CUT FLOWERS

CROSS REFERENCE TO RELATED APPLICATION

This application is the 35 USC 371 National Stage of International application PCT/NL97/00336 filed on Jun. 16, 1997, which designated the United States of America.

FIELD OF THE INVENTION

The invention relates to floral foam containing nutrients and preservatives for cut flowers.

BACKGROUND OF THE INVENTION

Floral foam has already been used for a long time as an aid for arranging cut flowers. The foam is used to hold the flowers in position and can absorb water and thus supply water to the flowers. It is also known that a floral foam of this type can be brought into contact with a solution of nutrients and/or preservatives. For instance, Australian Patent Application 95/24825 describes the adhesion of pieces of foam to a support. Said foam is saturated with water which can contain a preservative and subsequent insertion of cut flowers in the foam can take place.

The disadvantage of this well-known method is that the user has to work with nutrient solutions and has to choose the right quantity thereof. It will not take long before the dosage deviates from the right quantity to be used. An adequate action of the nutrients and preservatives is therefore not assured.

SUMMARY OF THE INVENTION

The invention relates to floral foam and its production method wherein the foam has been injected beforehand with the appropriate quantity of nutrients and preservatives, which makes the foam particularly easy to use and has a better result.

DETAILED DESCRIPTION OF THE INVENTION

According to the invention the floral foam containing nutrients and preservatives for cut flowers is characterised in that the foam has been pre-injected with nutrients and preservatives in an amount of 6–15 g, preferably of 8–12 g, per $dm^3$ water which can be absorbed by the foam.

Using the indicated quantity of nutrients and preservatives diluted in water the keeping qualities are better than those obtained with a similar floral foam which contains water only. In particular, the quantity of nutrients and preservatives is such that the longevity of the flowers is improved by at least 25%, or at least 2 days. A prolonged longevity of 50%, or 6 days is also achievable.

The correct quantity of nutrients and preservatives depends on the quantity of water which can be absorbed by the floral foam. This quantity can be determined easily by weighing the piece of dry floral foam, then placing the piece of floral foam in water until no further water is absorbed and then determine the weight again. The difference is the weight (and after converting g to ml) also the volume of water which can be absorbed by the floral foam. The quantities of nutrients and preservatives to be injected are 7–11 and 0.02–3 g respectively per $dm^3$ or rather 8–10 and 0.025–0.5 g respectively per $dm^3$.

The material used for the floral foam according to the invention can be any material customary for this purpose, such as phenolic resin foam. The only condition is that the foam can be injected and is water-absorbent, which condition is met by the majority of floral foam materials. Common types of floral foam are, for example, obtainable under the tradenames OASIS, SWAMPY, SAVANNA, MOSY, JIFFY, etc.

The nutrients which can be used are the types customary for cut flowers, such as glucose, sucrose and other sugars. Suitable preservatives are the conventional agents, such as anti-fungal or anti-bacterial agents, for example aluminum sulphate, and optionally agents for algae control. In addition to nutrients and preservatives, other active substances, such as odour substances, colorants, fortifiers, osmosis regulators (for example potassium ions), pH regulators, and the like, can also be present in the floral foam.

The floral foam according to the invention can be produced starting from a foam mould into which a concentrated solution or dispersion of the nutrients and preservatives is introduced.

The invention concerns a production method for manufacturing floral foam containing nutrients and preservatives for cut flowers. In this foam 10–30 ml of a solution containing nutrients and preservatives per $dm^3$ water is injected which can be absorbed by the floral foam. The solution or dispersion contains 3.5–5.5 mg, preferably 4–5 mg nutrients and 0.01–1.5 mg or rather 0.025–0.5 mg preservatives per ml.

The solution or dispersion is preferably injected with the use of an injection needle and preferably by machine. For this purpose, floral foam bodies can be arranged in groups and injected at the same time, for example 20 at a time. The distance between the pieces of floral foam determines the distance between the needles and the depth of the pieces determines the length of the needles. The injection needles preferably have an internal cross-section of 0.1–2.0 mm, in particular 0.5–1.0 mm. Injection of floral foam bodies in containers or displays is also possible.

It is possible, for example, to insert the injection needles into floral foam bodies to a depth of about 4 cm from the bottom. As soon as the needle is being withdrawn from the foam one can start to inject. By doing this the solution is distributed evenly over the floral foam body.

The solution or dispersion with which the floral foam is injected contains the above-mentioned quantities of nutrients and preservatives. The injection volume is so small that the floral foam remains virtually dry.

The injected floral foam can be packed and transported without further treatment. No special storage conditions are required compared with those for conventional, non-injected floral foam. The floral foam can, if desired, be treated in the same way as conventional floral foam.

The invention also relates to the use of the floral foam described above for the arrangement of cut flowers and other plant parts and for improving the longevity of the flowers arranged. For this purpose the floral foam can be brought into contact with water, possibly after it has been brought into the desired shape, so that it becomes saturated and the cut flowers can be inserted in the foam before or after this. Watering the foam from time to time is then sufficient to keep the flowers beautiful for a long time. The longevity of cut flowers in the floral foam according to the invention is improved compared with those for flowers in untreated floral foam (by 2–6 days, depending on the variety of flower) and the flowers bloom better.

What is claimed is:

1. A floral foam for cut flowers, comprising:

a foam substrate containing pre-injected nutrients and preservatives in an amount of 6–15 g per $dm^3$ water to be absorbed by the foam substrate; and a plurality of needle holes extending into said foam substrate, said holes being structured and arranged to distribute said nutrients and preservatives evenly into said foam substrate.

2. The floral foam according to claim 1, wherein the amount of nutrients and preservatives per $dm^3$ water to be absorbed is 8–12 g.

3. The floral foam according to claim 2, wherein the amount of nutrients and preservatives per $dm^3$ water to be absorbed is 9–11 g.

4. The floral foam according to claim 2, wherein the amount of nutrients is 7–11 g and the amount of preservatives is 0.02–3 g.

5. The floral foam according to claim 1, wherein the nutrients comprise sugars selected from the group consisting of glucose and sucrose.

6. The floral foam according to claim 1, wherein the preservatives comprise a biocide.

7. The floral foam according to claim 6, wherein the biocide is aluminum sulfate.

8. The floral foam according to claim 1, wherein the needle holes are produced by a needle having an internal cross-section ranging from 0.1 to 2.0 mm.

9. Method for producing a floral foam containing nutrients and preservatives for cut flowers, which comprises pre-injecting the floral foam, by using an injection needle, with 10–30 ml of a solution containing nutrients and preservatives per $dm^3$ water to be absorbed by the floral foam, and be evenly distributed over the floral foam.

10. The method according to claim 9, wherein the needle is withdrawn from the foam during injection of the solution.

11. The method according to claim 9, wherein the solution contains 3.5–5.5 mg nutrients and 0.025–0.5 mg preservatives per ml.

12. The method according to claim 9, wherein the needle has an internal cross-section ranging from 0.1 to 2.0 mm.

* * * * *